Patented Dec. 16, 1952

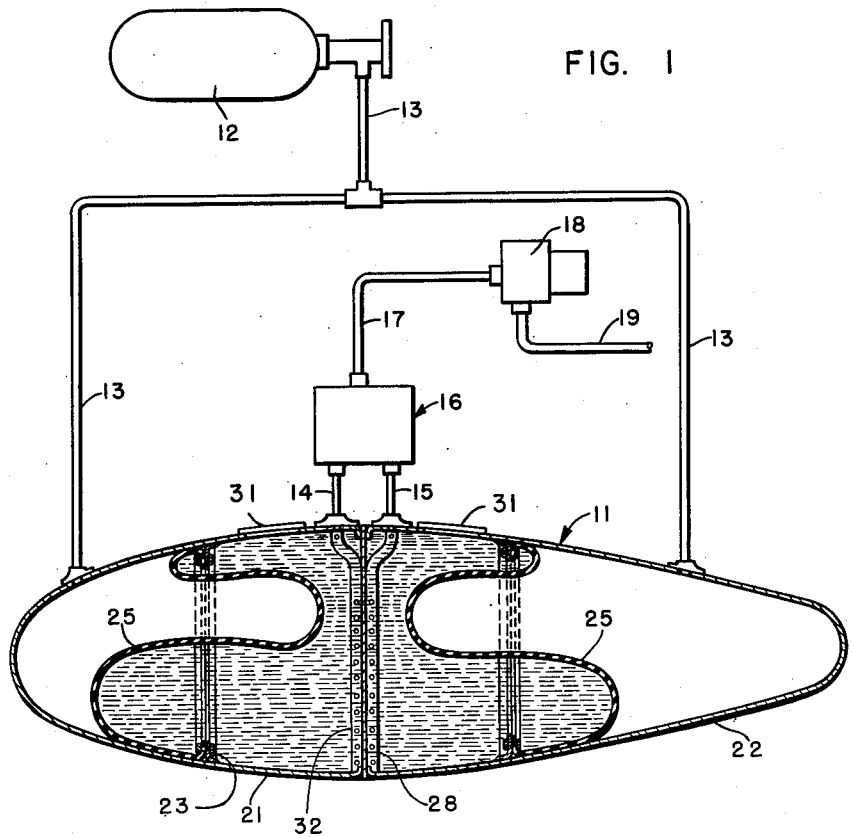
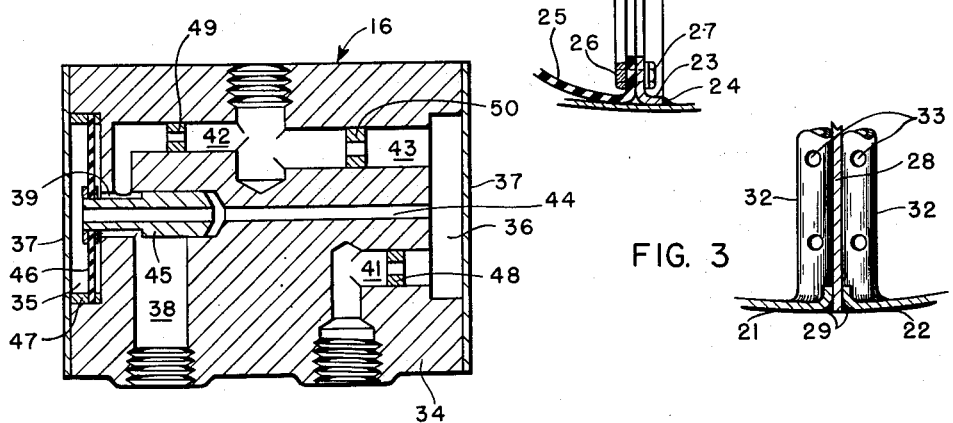

2,621,719

UNITED STATES PATENT OFFICE 2,621,719

CONSTANT CENTER-OF-GRAVITY LIQUID SUPPLY SYSTEM

Bruce G. Eaton, Columbus, Ohio, and William H. Peters, Snyder, N. Y., assignors to Curtiss-Wright Corporation, a corporation of Delaware Application May 3, 1947, Serial No. 745,872

9 Claims. (Cl. 158—50.1)

The present invention relates to a supply system for fuel or other liquid including a tank whose longitudinal center of gravity will remain substantially in the same location regardless of the amount of liquid in the tank or the attitude of the tank.

The invention is particularly useful for the fuel systems of aircraft, and especially for pilotless aircraft or flying missiles, where it is highly desirable that the longitudinal location of the center of gravity be maintained within close limits.

According to the invention the liquid supply system may include a tank having a partition dividing the tank interior into two compartments. Each compartment is divided into two chambers by a flexible membrane in the form of a bag whose open end is attached to the tank side walls between the partition and one end of the tank. Fuel or other liquid may be contained in the inner chambers of the tank, i. e., the chambers adjacent the partition. When the tank is filled the flexible bags are fully extended away from the partition and the inner chambers are thereby enlarged to include substantially the entire tank interior. Air or other gas may be introduced into the outer chambers so that as liquid passes from the inner chambers the bags are flexed toward the partition, and are fully extended toward the partition when all of the liquid has been removed from the inner chambers.

As liquid is removed from the tank, the remaining liquid is shifted toward the partition from both ends of the tank so that the longitudinal center of gravity remains substantially at the same point. Means are provided for metering the flow of liquid from the tank chambers so that the flow will be at the same rate from both chambers. Changing the tilt of the longitudinal axis of the tank results in only very slight shifting of the fuel in the two fuel chambers, and has little effect upon the longitudinal center of gravity location. Likewise the invention reduces surging of liquid resulting from accelerations of the system, the action of the gas pressure upon the bags being effective to constantly urge the mass of liquid toward the central tank partition.

The means acting on the liquid for preventing or reducing shifting of its longitudinal center of gravity are contained wholly within the tank, providing a simple, easily sealed and light weight structure which is well adapted for aircraft. The tank structure may be elongated, and of streamlined form if desired, making the tanks suitable for exterior mounting beneath the fuselage or wings, or at the wing tips of an aircraft.

Another advantage is that the air or other gas, when entered into the outer chambers under greater than atmospheric pressure for the purposes stated, will also serve to force liquid from the tank or to serve as a booster for a pump that is provided for this purpose.

The foregoing and other objects and advantages of the invention will become apparent from the following description of the typical embodiment shown in the accompanying drawings, wherein:

Figure 1 is a schematic illustration of a part of an aircraft fuel supply system, with the fuel tank thereof appearing in longitudinal cross-section;

Figures 2 and 3 are fragmentary sectional views on a larger scale illustrating the connection of the tank side walls respectively with the flexible bags and the central partition; and Figure 4 is a sectional view through the metering unit shown in Figure 1.

As illustrated in the drawings the liquid supply system may include a tank 11 into which air or other gas may be passed by conduits 13 from a pressure cylinder 12. Fuel passes from the tank through conduits 14 and 15 into a metering device 16 from which it passes through conduits 17 to a pump 18 which pumps it at the desired pressure through a conduit 19 to the aircraft engine, not shown.

The tank 11 may be of any suitable shape although it is preferably an elongated body of circular or oval cross-section. If intended for exterior mounting, it is preferably streamlined, as shown in Figure 1. For example, such a tank may be mounted directly beneath the center section of an aircraft wing, or two such tanks may be mounted on the wing, with one of them depending from each wing tip. Preferably the longitudinal center of gravity of the filled tank or the mean center of gravity of the tanks, in the case of plural tanks, will be close to the fore and aft C. G. location of the aircraft as a whole.

The tank 11 comprises a forward shell section 21 and an aft shell section 22 both preferably formed of aluminum alloy or other metal sheets. A ring 23 may be extended around the inner periphery of each shell section intermediate of its length to provide an inwardly directed flange. The rings may be angular in cross-section with one flange secured to the tank walls, as by seam welding indicated at 24.

Secured to each inwardly directed flange is a membrane 25 of flexible, substantially non-stretchable material. One suitable material is rubber having a cotton fabric embedded as a base therein and having an exterior coating of a flexible synthetic resin that is impervious to gasoline or such other liquid as may be intended to be contained in the tank. The membranes are bulged within their margins so as to constitute bags whose open end portions are secured to the inturned flanges. The bags may be clamped to the flanges by other rings 26 connected by bolts 27.

The shell sections 21 and 22 have inturned flanges at their open ends which may be secured by seam welding 29, as shown in Figure 3, to a sheet metal partition 28 which divides the tank interior into fore and aft compartments. The tank spaces between the partition and the flexible bags constitute the fuel chambers. Each of the latter chambers has a filler opening through the tank wall provided with a removable closure 31, and a fuel outlet communicating with one of the conduits 14 and 15. These outlets comprise tubes 32 secured to the partition and each having a plurality of openings 33 at spaced intervals along it length.

The outer chambers comprising the spaces between the tank ends and the bags communicate with the conduits 13 for receiving air or other gas under pressure from the cylinder 12. The flexible bags 25 are of such size that when the fuel chambers are filled the bags are extended away from the central partition, preferably lying substantially flush with and supported upon the tank inner surface. As the tank is emptied the bags flex toward the partition, an intermediate or half-empty condition being depicted in Figure 1. When completely emptied the bags are extended toward the central partition, being pressed by gas pressure against the partition and the portion of the tank side walls located between the rings 23 and the partition.

As the fuel chambers are emptied, fuel will pass through one or more of the openings 33 in each tube 32, and through the tubes 32 and conduits 14 and 15 to the other parts of the fuel system. The provision of a plurality of openings 33 at spaced intervals along each of the tubes 32 precludes the possibility of the bags completely sealing the fuel outlet before the fuel chambers are substantially completely emptied.

Due to the limited dimensions of the flexible bags, and the action of gas pressure on the outer faces thereof, the fuel in each of the two fuel chambers will be shifted equally toward the partition 25 provided that fuel is withdrawn from each at the same rate. The effect will be better understood when it is considered that the length of the serpentine cross-sections of the bags shown in Figure 1 is constant regardless of the extent to which the fuel chamber is filled, and that equal gas pressures are exerted at all points along these sections. The center of mass of the fuel on either side of the partition is restricted against appreciable movement longitudinally of the tank, regardless of the degree to which the tank is filled. Tilting or inversion of the tank will, of course, result in slight shifting of fuel, changing the curvature of bulge of the bag, but this will have only a small effect upon movement in a longitudinal direction of the center of gravity of the fuel.

The details of the metering device 16 form no part of the present invention, and are shown in Figure 4 only to afford a more complete understanding of the operation of the liquid supply system as a whole. The device comprises a body 34 with recesses 35 and 36 covered by plates 37. The body has a passage 38 communicating with conduit 14 and opening through a valve chamber 39 into the recess 35; a passage 41 communicating with conduit 15 and recess 36; and, communicating with conduit 17, a passage 42 extending to valve chamber 39 and a passage 43 opening into recess 36. A passage 44 extends through the body 34 from recess 36 to the inner end of valve chamber 39. Slidable in the latter is a hollow valve 45 whose stem extends into recess 35 where it extends through and is connected to the central portion of a flexible diaphragm 46. The periphery of the diaphragm is supported by rings 47 in spaced relation to the adjacent plate 37 and the bottom of recess 35.

Plugs 48, 49 and 50 with metering orifices therethrough are provided in passages 41, 42 and 43, respectively, so that the resistance to liquid flow is substantially the same from conduit 15 to recess 36 as from conduit 14 to valve chamber 39 when valve 45 is in its neutral position (shown in Figure 4), and also substantially the same from the valve chamber through passage 42 to conduit 17 as from recess 36 through passage 43 to conduit 17. The fluid pressure in recess 36 will equal that in recess 35, between plate 37 and diaphragm 46 because of the interconnection provided by passage 44 and the opening through valve 45. Consequently the diaphragm 46 and valve 45 will function to equalize the rates of fuel flow from tank 11 through conduits 14 and 15: if the flow from conduit 14 should be at a higher rate than from conduit 15, signifying a higher pressure in 14 than in 15, the diaphragm 46 will be moved to the right, as the parts appear in Figure 4, causing valve 45 to move to restrict the flow therepast until substantial equality exists. Conversely, if the flow from conduit 14 is at a lower rate than from 15, signifying higher pressure in the latter, the diaphragm will move the valve in the opposite direction, further opening it, and allowing increase of the rate of flow through conduit 15 until substantial equality results.

It will be understood that the specific form which the metering device takes is immaterial to the present invention, and that the latter will function in the manner described with any suitable metering means. It will be understood further that other details of the system, including those of tank structure, may be modified in various ways by those skilled in the art without departing from the spirit of the invention or from the scope of the appended claims.

I claim:

1. A liquid carrier comprising an elongated tank having adjacent its longitudinal center a liquid tight partition, a pair of collapsible liquid tight bags, one at either side of said partition and within said tank, the open ends of said bags having their edges sealed to the inner periphery of said tank substantially midway between said partition and the ends of said tank, the open ends facing the partition when the tank is filled with liquid, liquid outlet means from the tank on each side of said partition, and fluid pressure means for collapsing said bags in unison toward said partition to force the discharge of the liquid from said outlet means and reduce the volume within the bag equally on either side of said partition.

2. A liquid carrier comprising a tank having an upright substantially rigid and liquid tight partition, a pair of flexible and substantially non-stretchable bags, one at either side of the partition and with the open ends of the bags sealed to the inner periphery of the tank in spaced relation to the partition forming compartments between said bags and partition, means for conducting liquid from the compartments between the bags and the partition upon reduction in volume of said compartments, means for conducting fluid to the compartments formed between the bags and the ends of the tank for causing said reduction in volume, and means associated with one of said conducting means for substantially equalizing the reduction in volume of said first-mentioned chambers.

3. An aircraft fuel system comprising a tank of substantially streamlined form with a substantially vertical partition dividing the tank interior into fore and aft compartments, a flange extending around the tank interior in each compartment and disposed in a plane substantially parallel to said partition, a flexible membrane in each compartment secured at its margins to the flange in the compartment for dividing the latter into two chambers, each of the two chambers adjacent the partition being adapted to contain fuel, each membrane being in the form of a bag to allow a substantially complete emptying of the chamber adjacent the partition upon maximum flexing of the membranes toward the partition, means for introducing gas under pressure into the two chambers remote from the partition for urging flexure of the membranes toward the partition, and fuel passage means extending from the tank, said means including a fuel conduit extending along each side of the partition and each opening into the adjacent liquid compartment, and said means further including metering means for equalizing the flow of fuel from the compartments on opposite sides of said partition.

4. A liquid supply system comprising a tank having a substantially vertical partition dividing the tank interior into two compartments, a flange extending around the tank interior in each compartment and disposed in a plane substantially parallel to said partition, a flexible membrane secured to the flange in each compartment for dividing the latter into two chambers, each chamber adjacent the partition being adapted to contain liquid, each membrane being substantially in the form of a bag to allow a substantially complete emptying of the chambers adjacent the partition upon maximum flexing of the membranes toward the partition, means for introducing gas under pressure into the chambers remote from the partition for urging flexure of the membranes toward the partition, and liquid passage means extending from the tank, said means including a conduit extending along each side of the partition and each opening into the adjacent liquid compartment, and said means further including metering means for equalizing the flow of liquid from the compartments on opposite sides of said partition.

5. An aircraft fuel system comprising a tank having a substantially vertical partition dividing the tank interior into two longitudinally spaced compartments, a flexible membrane extending across each compartment for dividing the latter into a fuel chamber adjacent the partition and a gas chamber remote from the partition, the margins of each membrane being attached to the compartment wall substantially in a plane parallel to the partition, each membrane being bulged within its margins to allow substantially complete emptying of the respective fuel chamber upon maximum flexing of the membrane toward the partition, means for introducing gas under pressure to said gas chambers for urging flexure of the membranes toward the partition, and means for conducting fuel from said fuel chambers, said last-mentioned means including metering means for equalizing the flow of fuel from the two fuel compartments.

6. In combination, a fuel tank having a substantially vertical partition dividing the interior thereof into two longitudinally spaced compartments, a flexible membrane extending across each compartment for dividing the latter into a fuel chamber adjacent the partition and a gas chamber remote from the partition, the margins of each membrane being attached to the compartment wall substantially in a plane parallel to the partition, each membrane having a bulge formation within its margins to allow substantially complete emptying of the fuel chamber upon maximum flexing of the membrane toward the partition, means for introducing gas under pressure to said gas chambers for urging flexure of the membranes toward the partition, and means for conducting fuel from said fuel chambers including a conduit in and opening into each fuel chamber and disposed close to said partition.

7. In combination, a tank for liquid having a substantially vertical partition dividing the interior thereof into two longitudinally spaced compartments, a flexible membrane extending across each compartment for dividing the latter into a chamber for liquid adjacent the partition and a chamber for displacing gas remote from the partition, the margins of each membrane being attached to the compartment wall substantially in a plane parallel to the partition, each membrane having a bulge formation within its margins to allow substantially complete emptying of the fuel chamber upon maximum flexing of the membrane toward the partition, means for withdrawing substantially equal quantities of liquid from the chambers adjacent the partition, and openings through said tank into the chambers remote from the partition for admitting displacing gas thereinto.

8. In combination, a tank for fluid having a substantially vertical partition dividing the interior thereof into two longitudinally spaced compartments, a flexible membrane extending across each compartment for dividing the latter to provide a first pair of chambers adjacent to the partition and a second pair of chambers remote from said partition, each membrane being attached along its margins to the tank wall and having a bulge formation within its margins to allow substantially complete emptying of one chamber upon maximum flexing of the membrane into such chamber, the chambers of one pair being provided with flow means for admitting one fluid and the chambers of the other pair being provided with flow means for discharging another fluid contained therein, one of said flow means comprising a device for substantially equalizing the rate of discharge from the pair of chambers from which fluid is being discharged.

9. In a vehicle-carried fuel supply unit, two elongated tanks in tandem relation and adapted to be disposed in the vehicle longitudinally thereof, each tank having therein an elastic bag whose edges are secured to the interior lateral wall of the tank to divide it into a fuel chamber and an auxiliary chamber, said fuel chambers of the two tanks being disposed toward one another and the auxiliary chambers remote from one another, means to fill both fuel chambers and to displace said bags to diminish the volume of said auxiliary chambers, an outlet for each fuel chamber, means operable upon the withdrawal of fuel from said chambers to equalize the amounts of fuel withdrawn from both chambers and means to hold said bags in contact with the fuel in respective chambers and to increase the volume of said auxiliary chambers as fuel is withdrawn from said tanks, whereby to minimize longitudinal shift of the center of gravity of the fuel unit between the full and partly empty condition.

BRUCE G. EATON.
     WILLIAM H. PETERS.

REFERENCES CITED

The following references are of record in the file of this patent:

UNITED STATES PATENTS

| Number | Name | Date |
|---|---|---|
| 703,824 | Quinn | July 1, 1902 |
| 1,003,796 | Ragot | Sept. 19, 1911 |
| 1,237,891 | Fernandez | Aug. 21, 1917 |
| 2,063,430 | Graser | Dec. 8, 1936 |
| 2,102,590 | Gray | Dec. 21, 1937 |
| 2,347,379 | Teeter | Apr. 25, 1944 |
| 2,406,926 | Summerfield | Sept. 3, 1946 |
| 2,424,440 | Duffy | July 22, 1947 |

FOREIGN PATENTS

| Number | Country | Date |
|---|---|---|
| 2,096 | Great Britain | of 1865 |
| 11,006 | Great Britain | of 1917 |
| 566,271 | France | of 1923 |
| 590,818 | France | of 1925 |
| 744,815 | France | Jan. 26, 1933 |